(12) United States Patent
Kuenstle et al.

(10) Patent No.: US 12,448,834 B2
(45) Date of Patent: Oct. 21, 2025

(54) STORM SHUTTER PANEL SYSTEMS AND METHOD OF DESIGN

(71) Applicant: University of Florida Research Foundation, Inc., Gainesville, FL (US)

(72) Inventors: Michael Wayne Kuenstle, Gainesville, FL (US); John Bernal, Vero Beach, FL (US); Carlos Rios, Gainesville, FL (US); Margaret Sobrino Almanzar, Miami, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 186 days.

(21) Appl. No.: 17/875,633

(22) Filed: Jul. 28, 2022

(65) Prior Publication Data

US 2023/0043952 A1    Feb. 9, 2023

Related U.S. Application Data

(60) Provisional application No. 63/226,426, filed on Jul. 28, 2021.

(51) Int. Cl.
| | |
|---|---|
| *E06B 9/02* | (2006.01) |
| *G06F 30/27* | (2020.01) |
| *G06F 30/28* | (2020.01) |
| *E06B 9/00* | (2006.01) |
| *G06F 113/08* | (2020.01) |

(52) U.S. Cl.
CPC .......... *E06B 9/02* (2013.01); *G06F 30/27* (2020.01); *G06F 30/28* (2020.01); *E06B 2009/005* (2013.01); *G06F 2113/08* (2020.01)

(58) Field of Classification Search
CPC ............................. E06B 2009/005; E06B 9/02
USPC .......................................................... 52/202
See application file for complete search history.

(56) References Cited

U.S. PATENT DOCUMENTS

| | | | | |
|---|---|---|---|---|
| 841,490 | A * | 1/1907 | Montier | .................... E04C 3/04 52/591.2 |
| 1,983,040 | A * | 12/1934 | Lyons | .................. E04F 13/002 52/592.1 |

(Continued)

OTHER PUBLICATIONS

State of Florida Building Code, Section 1609.1.2—Protection of Openings, 6th Edition (2017), pp. 490-493.

(Continued)

*Primary Examiner* — Paola Agudelo
(74) *Attorney, Agent, or Firm* — THOMAS|HORSTEMEYER, LLP

(57) ABSTRACT

Various examples of a system and method for a storm shutter system is described. In one example, the system includes at least one rail configured to be secured to a building structure and a plurality of panels. Each panel includes a first surface configured to face an exterior environment of a building and a second surface configured to face an interior of the building; at least one perforation extending between the first and second surface; rail connection elements configured to attach the panel to a rail; and interlocking elements configured for panel-to-panel assembly. The panels are configured to be assembled by a single person. The interlocking elements are configured to connect one panel of the plurality of panels to another panel forming a unit of connected panels without using additional hardware.

17 Claims, 6 Drawing Sheets

(56) References Cited

U.S. PATENT DOCUMENTS

| | | | | |
|---|---|---|---|---|
| 2,243,161 | A * | 5/1941 | Lahti | E04B 1/541 |
| | | | | 52/592.1 |
| 2,302,962 | A * | 11/1942 | Laucks | E04C 2/12 |
| | | | | 52/436 |
| 4,034,528 | A * | 7/1977 | Sanders | E04D 3/352 |
| | | | | 52/404.4 |
| 5,426,893 | A * | 6/1995 | Hoffman | E06B 9/04 |
| | | | | 49/464 |
| 5,457,921 | A * | 10/1995 | Kostrzecha | E06B 9/02 |
| | | | | 52/798.1 |
| 5,487,244 | A * | 1/1996 | Hill | E06B 9/02 |
| | | | | 52/748.1 |
| 5,651,221 | A * | 7/1997 | Golen | E06B 9/02 |
| | | | | 52/630 |
| 5,855,099 | A * | 1/1999 | Hoffman | E06B 9/00 |
| | | | | 49/57 |
| 5,996,292 | A * | 12/1999 | Hill | E06B 9/02 |
| | | | | 52/748.1 |
| 6,189,264 | B1 * | 2/2001 | DiVeroli | E06B 9/00 |
| | | | | 160/215 |
| 6,209,263 | B1 * | 4/2001 | Poirier | E06B 9/02 |
| | | | | 49/463 |
| 6,615,555 | B2 * | 9/2003 | Madden | E06B 9/02 |
| | | | | 52/537 |
| 7,827,744 | B2 * | 11/2010 | Wenrick | E06B 9/02 |
| | | | | 52/202 |
| 11,280,085 | B2 * | 3/2022 | Buffington | E04C 2/20 |
| 2002/0162286 | A1 * | 11/2002 | Heissenberg | E06B 9/02 |
| | | | | 52/202 |
| 2013/0180188 | A1 * | 7/2013 | Motosko | F16B 33/00 |
| | | | | 411/366.1 |
| 2016/0362934 | A1 * | 12/2016 | Swafford | E05D 3/02 |
| 2018/0058094 | A1 * | 3/2018 | Filiba | E04H 17/168 |
| 2019/0338585 | A1 * | 11/2019 | Gilbert | E06B 9/02 |

OTHER PUBLICATIONS

Coastal Construction Manual, FEMA p. 55, vol. 1, Aug. 2011 (253 pages).

"First Alert Hurricane Shutters & Wholesale—Roll Shutters," downloaded from internet on Dec. 7, 2022 at https://firstalerthurricaneshutters.com/product-category/shutters/rollshutters/ . . . ) (4 pages).

"First Alert Hurricane Shutters Windows & Wholesale—Storm Panels," downloaded from internet on Dec. 7, 2022 at https://firstalerthurricaneshutters.com/product-cateogry/shutters/stormpanels/...) (4 pages).

"First Alert Hurricane Shutters Windows & Wholesale—Accordion Shutters," downloaded from internet on Dec. 7, 2022 at https://firstalerthurricaneshutters.com/product-cateogry/shutters/accordion/...) (5 pages).

"First Alert Hurricane Shutters Windows & Wholesale—Colonial Shutters," downloaded from internet on Dec. 7, 2022 at https://firstalerthurricaneshutters.com/product-cateogry/shutters/colonialshutters/ . . . ) (4 pages).

"First Alert Hurricane Shutters Windows & Wholesale—Bahama Shutters," downloaded from internet on Dec. 7, 2022 at https://firstalerthurricaneshutters.com/product-cateogry/shutters/bahamashutters/ . . . ) (4 pages).

* cited by examiner

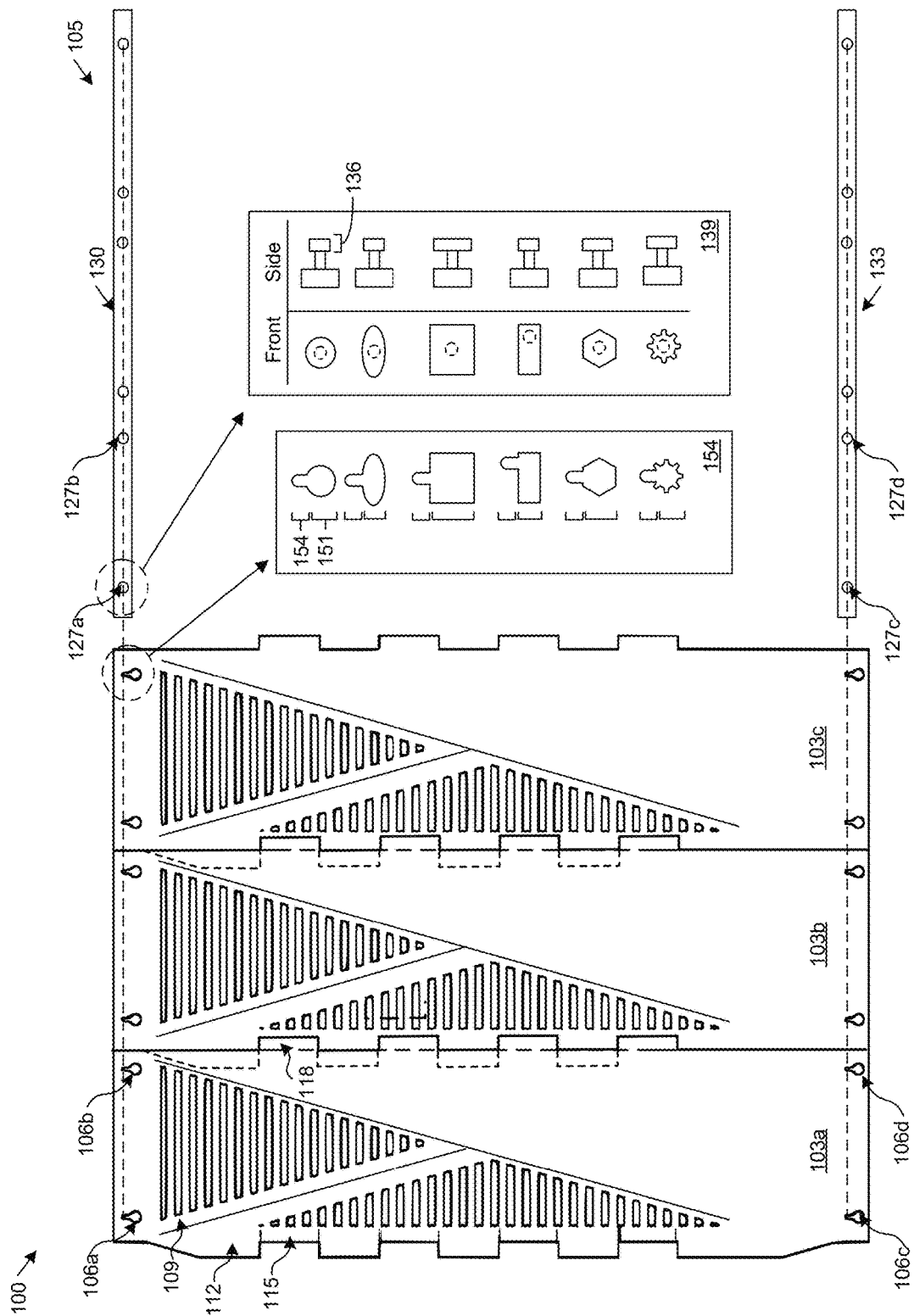

STORM SHUTTER PANEL SYSTEMS AND METHOD OF DESIGN

CROSS-REFERENCE TO RELATED APPLICATIONS

This application claims priority to and the benefit of U.S. Provisional Application No. 63/226,426, filed on Jul. 28, 2021, and entitled "STORM SHUTTER PANEL SYSTEMS AND METHOD OF DESIGN," which is hereby incorporated herein by reference in its entirety.

BACKGROUND

Providing adequate protection for openings in the building envelope remains a critical issue for resilient design in coastal regions subject to high winds and wind-borne debris associated with the landfall of tropical storms. While some minor improvements have been made to standard "hurricane shutters" used in single family dwellings, these important building components are mostly crude appropriations of standard light gauge aluminum decking, roll-up and accordion type doors, corrugated plastics and even pre-cut sheets of plywood stored on site and installed temporarily for the storm event.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIG. 1A illustrates an example shutter panel system according to various embodiments described herein.

DETAILED DESCRIPTION

Figure 1B:
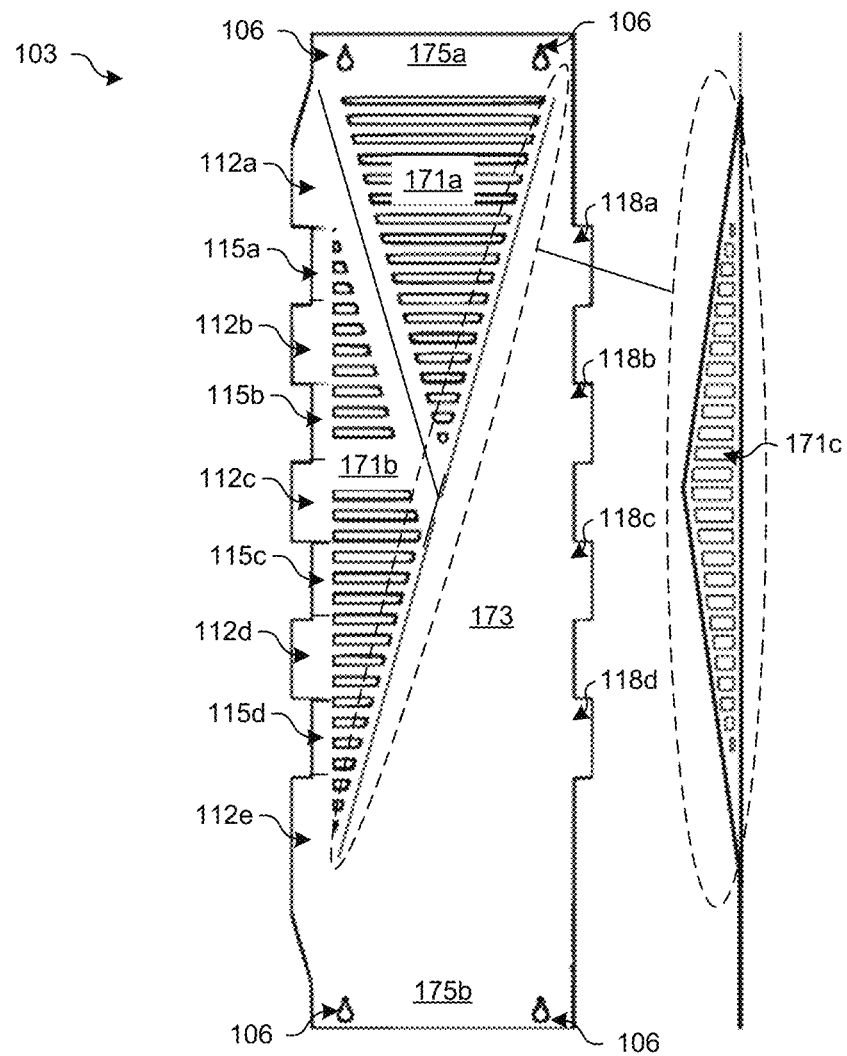
FIG. 1B illustrates an example of a top view and a side view of a shutter panel of the shutter panel system of FIG. 1A according to various embodiments described herein.

Various embodiments of a storm shutter panel system and method of design are described. The storm shutter system provides a new aerodynamic and stackable hurricane shutter design that have integral connections for panel-to-panel assembly by a single person. The panels are perforated to allow for daylight, air flow and vision for security. The shutter panels connect to the building using a proprietary track system.

Various embodiments of the storm shutter panel systems and method of design are described. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by the data processing apparatus, cause the apparatus to perform the actions. One general aspect includes a system for providing evaluation for optimization of design parameters. The system also includes a computing device that may include at least one hardware processor. The system also includes program instructions executable in the computing device that, when executed by the computing device, cause the computing device to generate a model of a panel using a computer-aided design (CAD), simulate a wind flow test on the model of the panel using computational fluid dynamics (CFD), and adjust panel features for surface optimization. Other embodiments of this aspect include corresponding computer systems, apparatus, and computer programs recorded on one or more computer storage devices, each configured to perform the actions of the methods.

The present application and drawings also correspond to a design according to a software implemented design flow based on design principles described below. An innovative approach to the design of a standard "hurricane shutter" implementing a design method that incorporates computer simulation modeling and digital fabrication techniques. One goal for the design of these important safety elements is to generate performance-based shutter designs optimized for multiple design parameters that existing shutter designs are unable to address.

The storm shutter panel system can have a surface and/or shape and structure optimized for stress and pressure distribution. The integration of connections between each component and the component assembly to the building can be configured to function without hardware. The storm shutter panel system can be configured for the mitigation of high winds and wind-borne debris, to withstand impact testing. The system can be configured to provide for visual connectivity between interior and exterior for natural lighting and security both during and after the storm event. The storm shutter panel system can be configured to be stacked, stored, and erected by a single person.

The system can be configured for constructability, mass customization, and/or 3D printing full size components. For example, the fabrication process can include die stamping, CNC brake press, 3D printing, and the like. For example, the materials can include mild sheet steel or aluminum, high performance polymer or composite, similar to sheet metal, or another material of similar properties.

Some example techniques for fabrication can include: punch and die CAD modeled and cut on CNC machines, prototype punch and die (short run), computer modeled shape cut and fold with brakes, minimal welds (handmade), FDM type printing, computer model exported to 3D printer software with wall thickness and support settings determined, and other similar processes for manufacture.

The performance and functionality of the panels fabricated using different techniques and materials can be evaluated based on existing codes for a geographical area or zone. In an example, the panels can be tested for compliance with ASCE 7 and ASTM requirements. For example, the Florida Building Code (FBC) requires windows to be impact-resistant or protected if located within one mile of the coast where the wind speed is 110 mph or greater during a storm event.

The storm shutter system integrates computational fluid dynamics technology into a generative parametric process for the design and optimization of new hurricane shutter panels. Computational Fluid Dynamics (CFD) simulation modeling can be used in applications for building design and material science research. CFD technology is among the powerful digital tools that enable architects, engineers, and researchers to develop creative methodologies for analysis, testing, and visualization of an array of building performance criteria, including air flow. Methods for advancing building design related research in coastal areas subject to high wind forces are discussed herein.

CFD simulations can be used to construct a visual window onto the dynamic, viscous, and bifurcating world of fluid media interactions. The visual simulation of this phenomenon is developed and approximated through space and time-based numerical solutions of conservation equations for mass, momentum, and energy in terms of fluid velocity and pressure for flows within a specified fluid flow regime. Work on the governing partial differential equations for fluid flow and turbulence modeling finds its origin in fluid mechanics. Numerical methods commonly used in CFD software include the finite element method, the finite difference method, and the finite volume method.

The development and widespread use of contemporary simulation modeling and visualization for these complex mathematical equations is made possible by the development and availability of low-cost high-speed computing. In many respects, the evolution of CFD technology into a powerful tool parallels the development and availability of high-speed computers. The immense number of iterative processes required for convergence of the numerical equations, and the ability to generate intelligent meshing schemes is aided by high-speed computing.

Design methods can successfully integrate CFD software originated in the aeronautical and civil engineering disciplines working on high performance design problems. For examples, designs can be tested with various materials, shapes, and thicknesses to comply with specific requirements. Airfoil analysis and design for uplift, shape optimization for super-efficient high-speed trains, and fast race cars were some of the early, popular applications. These methods of analysis and design can be used for the present designs. In the building design research disciplines for example, CFD applications can facilitate a wide range of modeling scales and simulation types for building analysis. The flow of wind-borne contaminants around the perimeter of a building in an urban environment, the prediction and measure of air flow delivered to meet comfort level specifications in an HVAC system, and the analysis of thermal transfer on a building envelope are a few examples.

Various examples presented herein can show the ability to integrate CFD technology into a structural design methodology for the described shutter panels. One example describes how a wind load analysis can be performed on a simple building geometry located in a high wind prone area with varying topographic conditions. The methodology provides for a foundational understanding of how pressure generated dynamic loads acting on a building surface can affect the lateral load part of a structural analysis.

Without the use of a wind tunnel or cumbersome hand calculations, the CFD simulations provide a method to visualize the complex interactions between building geometries, high wind flow, and the described shutter panels. The positive and negative wind pressures derived from the analysis can be integrated into structural design criteria for the lateral load forces on the subject building and panels. One aspect of the CFD simulation includes advanced visualization of the complex wind flow phenomena. The design is backed by verification and validation techniques for the numerical results. Some CFD numerical solutions can be based on CFD software for adequate validation of the numerical results, but these systems can also provide insight and knowledge of the underlying physics at work in the CFD methodology.

Further examples can fully integrate CFD technology into a generative parametric process for the design and optimization of new hurricane shutter panels as described herein. Again, working in a high wind environment, these shutter panel designs can mitigate wind-borne debris found in coastal areas worldwide while providing visibility and ventilation in a toolless and fastener-free design. The designs implement a methodology where CFD aids in the visualization of stress distribution over several iterations of folded, pleated, and tessellated surfaces. In addition to the shutter panel surface analysis, the integration of CFD analysis enables iterative testing of a number of other performance criteria that are simultaneously integrated into a 3D modeling simulation and a 3D printing process for analyzing the panels. Shape optimization for resistance to pressure, percentage of openness to allow for ventilation and day lighting, and material selection for manufacture, storage and assembly were among the primary performance measures that influenced the generative shape and geometry of the shutter panels. For example, software can be used that includes computer aided design (CAD) and computer aided manufacture (CAM), which can automate the domain discretization and computational process for convergence of the numerical model using fluid dynamic techniques.

Wind Tunnel Simulation

Buildings and the component assemblies developed for their construction are very expensive and the physical facilities required for testing and evaluating their performance are often inaccessible. If a building geometry or the environment in which it is proposed for construction has any uncommon features, like a complex geometrical shape (a twisted tower) or unusual surrounding terrain, then prescriptive type methodologies found in model software for determining lateral loads on the building cannot be used. Instead, costly wind tunnel testing is required.

With the development of commercially available CFD software in combination with access to more powerful computers, CFD applications can be used for performance-based analysis that enables the integration of simulation modeling. Physical model testing remains part of the design analysis, however the iterative studies that can be generated with computer simulation that serves to optimize the demands on performance-based design criteria to advance and expand the performativity design process.

Below is a description of the integration of CFD simulation modeling into a wind mitigation design for building structures located in wind hazard prone geographies. Some of the basic principles and foundational concepts of fluid flow and wind pressure, as well as their translation into design criteria for structural analysis and design are reviewed, followed by a discussion of a CFD application case study for a simulated hurricane force wind flow over a low rectangular building geometry. The techniques and parameters for development of the simulation are discussed and interpretations of the results are evaluated by comparing its predictions against existing experimental and analytical data, with special attention paid to the American Society of Civil Engineers, Minimum Design Loads for Buildings and Other Structures (ASCE 7), and the prescriptive methods found in the International Building Code (IBC).

The wind tunnel simulation for a hurricane force wind flow over a low rectangular building using the k-epsilon (k-ε) turbulence model has evolved within the framework of commercial CFD software, for example Phoenics-Cham. To establish a theoretical foundation for the initial case study CFD application, some preliminary groundwork and discussion is required to assist in defining the general perspective and scope of the investigation. While there is great interest and value in the graphic simulation of the wind velocity and pressure distribution patterns generated with the study, it is also desirable to schematically develop a well-posed problem based on established governing principles. Most important, a geometrically precise and numerically robust scheme allows for a more convincing comparison of the simulation results with existing data and methods.

The analysis and design of structural systems for buildings, engineers and architects can involve classifications including two general classifications of loads acting on a structure, including static loads and dynamic loads. Static loads and their resultant stresses and strains are, for the most part, considered highly predictable in character and can be computed with a great degree of confidence. Dynamic loads, on the other hand, are load sources generated by probabilistic events and involve motion in the delivery of an energy load to the building structure. The two primary conditions under which building structures are subject to dynamic loading are during seismic and windstorm events. In the later condition, which is the focus of this discussion, the dynamic loads associated with wind flow can often be sudden, complex, and unpredictable, as in a turbulent flow of wind caused by vortex shedding of an adjacent building or simply as in a brief gust of high wind associated with a seasonal weather storm. It is during these conditions that the resultant forces of the dynamic load source are often characterized by rapid changes in magnitude, direction and distribution over a given structure making the design criteria for the expected behavior and deformations complex and difficult to predict.

The following brief discussion of principles regarding the behavior of wind as developed in fluid mechanics can aid partially in understanding and in translation of the CFD simulation results. In fluid mechanics, the fundamental behavior of a fluid regime follows the laws of conservation for mass, momentum, and energy as well as the basic principles of Newtonian physics extended from solid mechanics. In this context, wind can be fundamentally defined as a moving fluid. The fluid in question has the specific physical properties of air with a given mass density, temperature, and viscosity, and flows at a determined velocity through some known domain with assigned physical boundaries.

Furthermore, as the stream of air interacts with each of its boundary elements, some of the stream flow is deflected producing a force, referred to as dynamic pressure, which is applied to the surface of the boundary element. The point of application of the dynamic pressure acts normal (perpendicular) to the surface and its direction can be either toward the surface (+) or away from it (−). The magnitude of the dynamic pressure generated from the fluid flow is derived from the potential energy of the kinetic energy (E=ma) of the fluid, in this case moving air, as summarized by application of the Bernoulli equation for fluid flow, which yields the expression:

$$q = \tfrac{1}{2}\rho V^2 \tag{Eq. 1}$$

where q is the resultant dynamic pressure of the potential energy, p is the mass density of the fluid, and V is the velocity vector of the fluid flow.

Additionally, when a fluid stream flow parallels a boundary element, the surface of the boundary element will retard the flow of the fluid due to friction caused by shear stresses developed between the fluid media and the surface. The amount of deceleration to the flow stream near the boundary is directly related to the roughness of the boundary's surface.

The profile of this behavior which can be computed by application of the power-law scheme as is commonly used in an engineering practice for approximating specified atmospheric boundary layer conditions summarized as $$V = V_{ref}(Z/Z_{ref})^{1/\alpha} \tag{Eq. 2}$$

where $V_{ref}$ is the reference velocity, Z is distance from the boundary corresponding to velocity V, $Z_{ref}$ is the distance from the boundary corresponding to velocity $V_{ref}$ and α is the roughness coefficient for a given exposure condition.

The third and perhaps most important principle related to the study of any flow regime is the principle that links fluid pressure with velocity along a 2D flow stream. Numerically expressed as a derivative of the Bernoulli equation, and likewise referred to as the Bernoulli effect, the principle fundamentally states that there is a very simple relationship between the fluid pressure and velocity at one point and the fluid pressure and velocity measured at another point along a 2D stream flow—specifically that the pressure plus the kinetic energy of the fluid at the first point equals the pressure plus the kinetic energy of the fluid at the second point. In other words, due to the laws of conservation for mass and momentum, as the velocity increases or decreases along its flow path, its corresponding pressure will decrease or increase to create a form of fluid equilibrium. This relationship is summarized by the following expression:

$$q_1 + \tfrac{1}{2}\rho V_1^2 = q_2 + \tfrac{1}{2}\rho V_2^2 \tag{Eq. 3}$$

and finds many applications in fluid dynamics. A significant attribute of CFD software is the ability to extend these principles into a 3D domain in which the time averaged Navier-Stokes equations are solved.

As an example, the CFD study for the schematic development of parameters for the computational domain, the Shah and Ferziger solution for a fully developed turbulent flow over a wall mounted cube can be used. The final domain parameters and placement of the building structure was determined after several trial study applications with the CFD solver.

The simulation included a single-phase flow, implementing the k-ε turbulence model, has 216,000 cells and is converged after 10,000 iterations. The attributes of the boundary conditions for the building were determined within the software.

Figure 6:
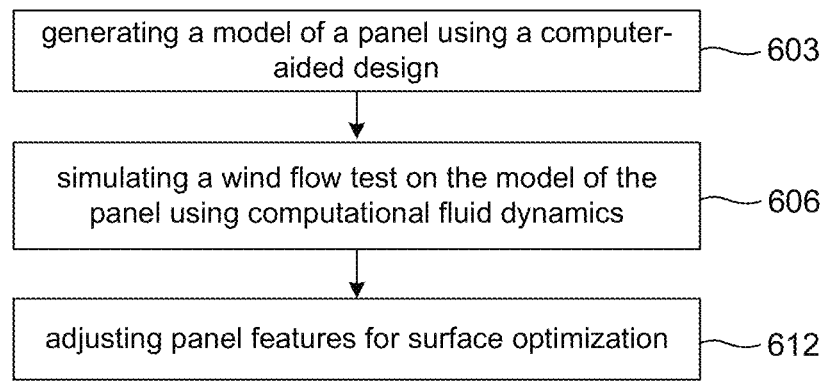
FIG. 6 illustrates an example method of design of a shutter panel system according to various embodiments described herein.

To determine the inlet velocity, a 3-second gust wind speed of 63 m/s (140 mph) was selected from the "Basic Wind Speed" map, figure 6-1b of ASCE 7 which corresponds with the southeast Atlantic coastal region of Florida. The recorded wind speed was converted from exposure category C to exposure category D using a derivation of the power-law expression (Eq. 2) summarized as $$Vz = [V_{ref}(V_{refg}/V_{refz})^{1/\alpha}](Z/Zg)^{1/\alpha} \tag{Eq. 4}$$

where $V_{ref}$ is the reference velocity from the wind speed map, $V_{ref\,g}$ is the gradient height for the reference velocity exposure, $V_{ref\,z}$ is the height above the ground surface for which the reference velocity was recorded, Z is the height above the ground surface for velocity Vz, and Zg is the gradient height for the corresponding exposure category for Vz. The profile exponent α and corresponding gradient heights were determined from table 6-4 of ASCE 7, where α=9.5 for category C and α=11.5 for category D.

$$Vz=[63m/s(274.32m/10m)^{1/9.5}](10m/213.36m)^{1/11.5}=68m/s(153mph)$$

After the initial wind speed adjustment, a wind velocity profile was determined using the power-law scheme (Eq. 2), then input into the software to study the development of the flow and its behavior within the domain boundary prior to incorporating the building into the simulation.

The primary sensitive issue that emerged from the trial results relating flow development, domain geometry, and mesh size to convergence of the governing equations involved a fine tuning of the placement of the building structure relative to the velocity inlet and outlet. Full development of the velocity profile was required windward of the building and could only be determined through preliminary testing. Since this is based on the concept of a "gust wind," it can be determined that the flow had to envelope the entire structure.

For verification of the simulation results both the ASCE 7 (Eq. 6) and the IBC (Eq. 7) provide similar standard formulas and tabled coefficients relating to height, exposure, and building geometry for calculating design velocity pressures. In each of the methods the dynamic velocity pressures are derived from the kinetic energy of moving wind, as discussed previously, and are converted into an equivalent static load developed form Bernoulli (Eq. 1) and Newton's law of a mechanical force (F=ma) yielding the following expression:

$$q=0.613V^2(N/m^2) \quad q=0.00256V^2(lb/ft^2) \quad \text{(Eq. 5)}$$

where (Eq. 1) is modified to compensate for the units which relate the mass density of air (1.22 kg/m³ at 150° C. or 0.07651 lb/ft³ at 59° F.) to force (N/m² or lb/ft²) using Newton's second law for which acceleration is g=980.7 cm/sec² (32.2 ft/sec²).

The CFD software computed pressure values and their distribution over the windward surface for the simulation were illustrated. The positive (inward acting) pressures range from 2861 Pa (59.75 lb/ft²) to 167.4 Pa (3.5 lb/ft²) with a small quantity of negative (outward acting) pressure very near the perimeter of the windward surface where turbulence is created at the edges. The majority value of the pressure is in the 2861 Pa (59.75 lb/ft²) range and the calculated average pressure over the 960 cells is 2310 Pa (48.2 lb/ft²). To compare the software generated values with those obtained through the ASCE 7 method; the following calculations were made (ASCE 7-16):

$$p=q\,G\,C_p-q_i(G\,C_{pi}) \quad \text{(Eq. 6)}$$

q=0.613(1.04)(63 m/s)²=2530.31 N/m²(52.8 lb/ft²)
p=2530.31(0.85)(0.8)−2530.31(−0.18)=2176.06 N/m² (45.44 lb/ft²)

and similarly, by using the International Building Code method (IBC 2018):

$$p=q\,Ce\,C_q q_s I \quad \text{(Eq. 7)}$$

q=0.613 (49.2 m/s)²=1483.85 N/m² (30.9 lb/ft²)
p=(1.45)(0.8)(1483.85)=1721.26 N/m² (35.9 lb/ft²)

Note that for the same geographic location, the IBC uses the lower "fastest mile" wind speed and a higher value for the gust coefficient compared to the ASCE 7. Also, the ASCE 7 computation includes internal pressure on the windward surface. The importance factor in each equation is ignored. As the wind profile for the simulation was developed for a 3-second gust wind speed, the simulated values correspond more closely to the ASCE 7 method as demonstrated. The simulation result 2310 N/m² is slightly above the ASCE 7 result 2176 N/m² and would be acceptable as a design value for a simple structure. While the IBC value are lower, they serve as a reference for comparison. Similar calculations can be made for the leeward and sidewalls as well as for the roof as can be understood.

The development of the initial CFD model established a clear relationship between the simulated wind phenomena and its interaction with the building structure. The preliminary results of the study were verified for accuracy by comparing a sample of its predictions against results using established methods and, therefore, demonstrate the application of CFD modeling in structural design. While the immediate potential of CFD modeling for use in wind engineering exists primarily in its extraordinary graphic capabilities for visualizing complex flow phenomena, the examples discussed herein show the simulation model will provide engineers and architects with a virtual tool to assist in mitigation of hurricane damage to buildings.

Storm Shutter Panel Design Using Computer Simulation Modeling Integrated with Digital Fabrication Techniques Providing adequate protection for openings in the building envelope remains a critical issue for a resilient design approach applied to coastal regions subject to high winds and wind-borne debris associated with the landfall of tropical storms. When a building envelope is compromised during high winds the result can be catastrophic as wind pressures can increase beyond the design strength of the building structure. Damaged windows, doors and other openings can allow water and debris to enter the building and can also present a security concern after the storm event. The concept of a shutter on a single-family residential elevation, if used at all, has been mostly reduced to a decorative element with the storm protection for window openings being provided by expensive impact resistant glazing systems or being provided by commercially available add-on type devices which can be referred to as "hurricane shutters," or shutter panels.

While some minor improvements have been made to the standard "hurricane shutter" used in single family dwellings over the past decade, these important building safety components are mostly crude appropriations of standard light gauge aluminum decking, corrugated plastic sheets, and roll-up or accordion type doors fitted to meet local building codes and standards. Despite stringent performance criteria and testing protocols developed for these important building elements, many in single family residences located in coastal areas still resort to pre-cut sheets of plywood stored on site and installed temporarily for the storm event. This approach meets building code requirements in many coastal areas, especially in production type single family housing and in retrofit situations in both rural and urban coastal areas. Performance based design innovation in this area will benefit the stakeholders and industry in building a more resilient community.

The shutter panels described herein explore an alternative approach to the typical design of a standard "hurricane shutters," or shutter panels. The described design methodology uses computer simulation modeling and digital fabrication techniques to focus on design resiliency for coastal environments. The Federal Emergency Management Agency (FEMA) literature provides an excellent resource for the various shutter types and code compliant method of attachment. They also outline the relevant American Society for Testing and Materials (ASTM) standards and testing protocols for general code compliance with the IBC and ASCE 7 as discussed above.

The method of design for the present shutter systems can be based on a number of design principles. The described shutters can be handled by a single person, can be stackable for storage, and can incorporate toolless and fastener-free (i.e., hardware-free) connections from panel to panel (e.g., interlocking sides), as well as hardware-free connections between the panel assembly to the building structure using a proprietary track system. The track system can comprise a rail assembly configured to receive the panel assembly. Designs requiring connection hardware can lose efficiency in the harsh coastal environment and pose problems for storage, assembly, and disassembly.

Another design principle for the shutter design system can include a design that can be fabricated using sheet metal fabrication techniques. For example, the proposed fabrication work for the panels could be performed using a press break or using techniques for stamping on a hydraulic press. The design panel geometry can include an unrolled shape and welds can be minimized or eliminated. An alternative design fabrication can include panel designs that are configured to be 3D printed full scale. This fabrication option uses more material science research for the 3D print medium attributes for modulus of elasticity as well as allowable unit stresses for tension, compression, and impact loading. Prior to testing any of the full-scale fabrication techniques, each panel can be studied in a CFD flow environment.

The described panels can be a result of analysis and evaluation using the following performance criteria:
1. Stress/pressure distribution and surface (shape) optimization.
2. The ability for integrating a method of connections between each panel component (using no hardware) and the connection of the component assembly to the building using a proprietary rail.
3. The ability to mitigate pressure from high winds and wind-borne debris (2×4 missile test).
4. The ability to provide for visual connectivity between interior and exterior for natural lighting (percentage of surface opening).
5. The ability to provide for ventilation and security during and after the storm event (percentage of surface opening).
6. Constructability and potential for mass customization and future possibilities for 3D printing full size components for testing.
7. The ability to stack the components for storage.
8. The ability to assemble the system by a single person.

Example Model Geometry and Mesh Generation for CFD Simulation can include a scaled model. The various parameters for the CFD model are listed in the table below. The shutter panels are constructed using CAD and wind flow simulations are performed using integrated CFD software, which can for example include Rhino, Grasshopper, and/or Pheonics.

| Parameters | Value |
|---|---|
| Panel size | 30 cm × 120 cm × 3 cm |
| | 12' × 48' × 1' |
| Domain size | Varies with shutter panel |
| Inlet wind speed | 63 m/s or 140 mph |
| Velocity profile | power-law |
| Turbulence model | k-ε |
| Roughness element | open terrain |
| Mesh Size | auto mesh enabled |
| Number of cells | min. 50 each direction |
| Iterations to convergence | 1000 |

Maintaining a prescribed panel perimeter dimension, 300 mm×120 mm, a flat panel surface can gain significant strength by introducing pleats, folds, and 3D tessellations to the surface. Iterations of these surface operations can be modeled using the techniques described, then exported and reviewed in the CFD flow simulation, and finally fabricated. The design can be 3D printed as scaled model panels for review prior to full scale fabrication and physical testing.

With each surface articulation, stresses can be observed and overall panel surface articulation depths and geometries can be adjusted for surface optimization. The shutter design paradigm demonstrates that there is a direct link between the surface articulation and stress distribution that can lead to the efficient panel designs described.

The software implemented design method can enable additional adjustments to address the issue of porosity. For example, parameters can include a minimum openness (e.g., in percent of total area or minimum area) and a minimum strength in terms of force or other measure of strength. Naturally, the openness can provide holes for light and visibility, pressure equalization, air availability, and other functions; but the openness can also generally reduce strength. Finally, the ability of the component design to adapt to other conditions is an important measure for the design system. A machine learning algorithm can be incorporated into the workflow to make each set of iterations even more efficient.

The parameters can be input into the algorithm in order to output an optimized panel design. In some cases, an initial panel design can be provided as an input, and the algorithm can output a modified panel design. The modified panel design can have a modified material thickness, a modified tessellation design, a modified slit, gap, hole, or opening width, and so on. The algorithm input parameters can also include available material widths and material properties available, such as metal widths, plastic widths, and so on. The material properties can include types of metals, plastics, resins, and other materials. Some materials can be 3D printed, and others can be molded, stamped, or cut using a CNC machine or another material cutting technique. The fabrication type such as 3D printing, stamping, and so on can be provided as an input. For 3D printing, the initial panel design can include a uniform material thickness the modified panel design can vary thicknesses since the 3D printing fabrication type is capable of varying thickness in different locations of the design. By contrast, the modified panel design can include the same or a different uniform thickness if the fabrication type includes a material cutting technique. Generally, molding and 3D printing can support varied material thickness as an output parameter of a modified panel design, while cut, score, and fold techniques can support uniform material thicknesses. This can also include an iterative process that continues to modify output designs.

Some outputs can have a more uniform strength across the whole design, or a part of the design, while others can favor a maximum average strength over an area of the whole or part of the design. All designs can have the minimum set according to a predetermined standard requirement as discussed. For example, an output can modify folds or ridge locations, material thickness, opening widths, and so on to achieve a more uniform strength. The design can include solid (e.g., opening-free) sections of the design, gapped sections of the design, panel-to-panel sections, and rail connection sections.

The final stage of the process can be to subject the shutter panels to full scale physical fabrication and testing. The physical testing results including success and failure, as well as a type or location of the failure can be provided as feedback to train the machine learning algorithm.

The availability and proficient use of validated CFD software has, in part, been made possible with their integration into popular CAD and Building Information Modeling (BIM) software platforms allowing for its widespread use within the design disciplines. The shutter panel design methodology demonstrates how good designs work on a simple building element that can provide a beautiful panel with maximized utility according to design parameters. Here the technology is leading to some interesting places in design research for resiliency and safety. In building structures CFD exhibits great potential for improving the understanding of wind phenomena and its dynamic interactions with the built environment. The foregoing principles are implemented using instructions executed in a computing device to design shutter panels that correspond to those shown in the various figures.

Moving to the figures, FIG. 1A shows an example shutter panel system 100. The shutter panel system 100 can include a number of shutter panels 103a-103c (shutter panels 103) and a rail assembly 105. The various shutter panels 103a-103c can be separate panels that interlock side-to-side and/or top-to-bottom. The shutter panels 103a-103c can each have a same or similar shape to one another, such that one side of a single one of the shutter panels 103 is designed to interlock with another one of the shutter panels 103. This design principle can enable any number of shutter panels 103 to interconnect with each other. While the following discussion refers to the shutter panel 103a for clarity, the discussion is equally applicable to any of the shutter panels 103.

A shutter panel 103a can include rail connection holes 106a-106d (rail connection holes 106). The shutter panel 103a can also include interlocking elements 112, 115, and 118. The interlocking elements 112, 115, and 118 can be configured to be integrated panel connectors for panel-to-panel connection without the use of hardware. The rail connection holes 106a-106d formed in the individual panels can enable a hardware-free (e.g., tool-free and fastener-fee) connection to the rail connection elements 127a-127d (rail connection elements 127) of the rail assembly 105.

The rail assembly 105 can include an upper rail 130 and a lower rail 133. The upper rail 130 and the lower rail 133 can be horizontally positioned and parallel. Alternatively, the upper rail 130 and a lower rail 133 can be vertically positioned and parallel. Some examples can further include both horizontally positioned and vertically positioned rails. The rail assembly 105 can be attached to a building structure, for example, over and under a window, door, skylight, or another opening or weak point of the building structure. The rail assembly 105 can be attached relative to, such as above and below, the opening or weak point of the building structure. This can enable the shutter panels 103 to protect the opening and the interior of the building.

The upper rail 130 can include the rail connection elements 127a-127b. The lower rail 133 can include the rail connection elements 127c-127d. The rail connection element 127a can include a panel holding component or panel retention component 136 at the end of a pin or rod. A panel retention component 136 can include various different panel retention shapes 139. The panel retention shapes 139 can include any shape that is larger than the pin or rod diameter. For example, the panel retention shapes 139 can include a circular shape, an ovular shape, a square shape, a rectangular shape, any polygonal shape from triangular with 3 sides to "n-gonal" with n sides, and as well as any unique shape such as a gear shape or star shape, and so on. The panel retention shapes 139 can connect to the pin or rod at the center, or with any predetermined pin or rod offset from center. The pin or rod can connect the rail connection elements 127 to the corresponding rail of the rail assembly 105.

The various rail connection elements 127a-127c can all have the same panel retention shape 139, or alternatively can use different panel retention shapes 139. For example, the left-hand rail connection elements 127a and 127c can have one panel retention shape 139, while the right-hand rail connection elements 127a and 127c can have another panel retention shape 139. Alternatively, the upper rail connection elements 127a and 127b can have one panel retention shape 139, while the lower rail connection elements 127c and 127d can have another panel retention shape 139. In further examples, all of the rail connection elements 127a and 127b can be different. The use of different shapes can help a user quickly visually orient a shutter panel 103a for connection to the rail assembly 105. The various different shapes and pin offsets from center of the shape can also allow the shutter panels 103 to fit over and connect to the rail assembly 105 while preventing other types or brands of panels from connecting to the rail assembly 105.

The various rail connection holes 106a-106d of the shutter panel 103a can match the corresponding panel retention component 136. Specifically, the rail connection hole 106a can match a shape of the rail connection element 127a, the rail connection hole 106b can match a shape of the rail connection element 127b, the rail connection hole 106c can match a shape of the rail connection element 127c, and the rail connection hole 106d can match a shape of the rail connection element 127d. However, each of the rail connection holes 106 can have a teardrop shape that includes a rail-matching shape 151 and a slot 154. The rail-matching shape 151 can match the panel retention shape 139 of a corresponding panel retention component 136 of a rail connection element 127. The slot 154 or rod slot can match a side of the pin or rod. Since the rod slot 154 is smaller than the panel retention shape 139, the rail-matching shape 151 and slot 154 can be considered a teardrop-shaped rail connection hole 106. The bottom of the teardrop-shaped rail connection holes 106 of the panel matches the panel retention shapes 139 of the rail assembly 105. This can enable a user to quickly visually orient a shutter panel 103a for connection to the rail assembly 105.

In some cases, the slot 154 can include a tapered area at the base where it merges with the rail-matching shape 151. This can enable the shutter panel 103a to securely fit over and stay affixed to the rail assembly 105. The slot 154 overall, or the tapered area, can be formed to have an engineering fit such as a clearance fit, transition fit, or interference fit relative to the rod. The slot 154, the tapered area, and/or the rail connection hole 106 overall can have a thicker material around its periphery to help with durability for installation and removal. In some cases, the thickness of the slot 154, the tapered area, and/or the rail connection hole 106 overall can match a length of the rod between the rail and the panel retention component 136.

Moving to FIG. 1B, shown is a top view and a side view of a shutter panel 103 of the shutter panel system 100 of FIG. 1A. As can be seen, the shutter panel 103 can include interlocking elements 112a-112e, 115a-115d, and 118a-118d. The interlocking elements 112a-112e and 115a-115d can be on a side of the shutter panel 103 opposite from the interlocking elements 118a-118d. The left-side interlocking elements 112a-112e can be designed to fit under the next shutter panel 103, and can be aligned at an angle that matches the underside of the right-side of the shutter panel 103 adjacent to the right-side interlocking elements 118a-118d (but not necessarily matching the right-side interlocking elements 118a-118d).

The right-side interlocking elements 118a-118d can be designed to fit into the left-side interlocking elements 115a-115d. In this case, the right-side interlocking elements 118a-118d can be considered male interlocking elements that fit into female left-side interlocking elements 115a-115d. The left-side interlocking elements 115a-115d and the right-side interlocking elements 118a-118d can be designed to form an engineering fit with each other. The right-side interlocking elements 118a-118d can be designed to match an angle of the left-side interlocking elements 115a-115d. There can be any number of interlocking elements on each side.

Specifically, the right-side interlocking element 118a can match an angle and form an engineering fit with the left-side interlocking element 115a, the right-side interlocking element 118b can match an angle and form an engineering fit with the left-side interlocking element 115b, the right-side interlocking element 118c can match an angle and form an engineering fit with the left-side interlocking element 115c, and so on. The size and angle of the interlocking elements can be the same or different from each set of left and right-side interlocking elements. From a side view, the shutter panel 103 can be seen to include a shape that provides impact strength by using a triangle shape in the "z" direction, which can be considered a direction orthogonal to a building structure, and orthogonal to an "x-y" plane aligned intersecting with all of the rail connection holes 106.

The overall tessellated shutter panel design can be designed and updated using computer-executed instructions which can include machine learning algorithms and other functions as discussed. For example, the height of the panel in the z direction can be an output from the machine learning algorithm, in addition to the uniform or varying material thickness across the solid areas and the slitted areas of the shutter panel 103. In some examples, the thickness of panel sections of the shutter panel 103 can be uniform or can vary depending on the fabrication design as well as input selections or parameters of the machine learning algorithm.

Panel sections can include tessellation areas such as polygonal or curved areas defined by tessellations or shapes that are designed and modified by the machine learning algorithm. The tessellation areas can include the slitted tessellation areas 171a-171c, and the solid or unslitted tessellation area 173. The panel sections can also include the solid rail connection areas 175a and 175b, as well as solid panel-to-panel interconnection sections that include the interlocking elements 112a-112e, 115a-115d, and 118a-118d. Each of the sections (and subsections like the interlocking elements 112a-112e, 115a-115d, and 118a-118d) can have a specified uniform (or varying) material thickness for that area provided as an output from the machine learning algorithm such that the overall structure conforms to the codes and strength requirements that are provided as inputs to the algorithm. The overall shape and dimensions of the area such as length and height can also be provided.

Figure 1C:
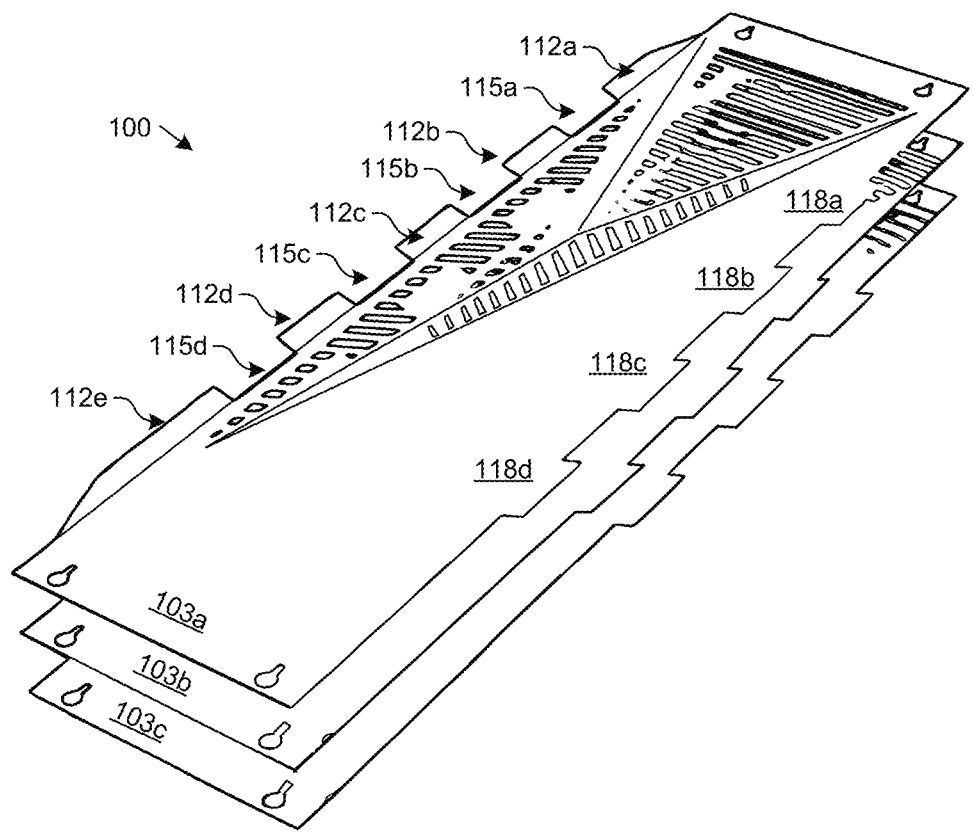
FIG. 1C illustrates an example of an isometric view of stacked shutter panels of the shutter panel system of FIG. 1A according to various embodiments described herein.

FIG. 1C illustrates an example of an isometric view of stacked shutter panels 103a-103c of the shutter panel system 100 of FIG. 1A. This figure shows that the shutter panel 103 is designed to be stackable for easy storage. This view also shows how the panel interconnection sections that include the interlocking elements 112a-112e, 115a-115d, and 118a-118d can be angled differently relative to the adjacent panel areas.

Figure 2:
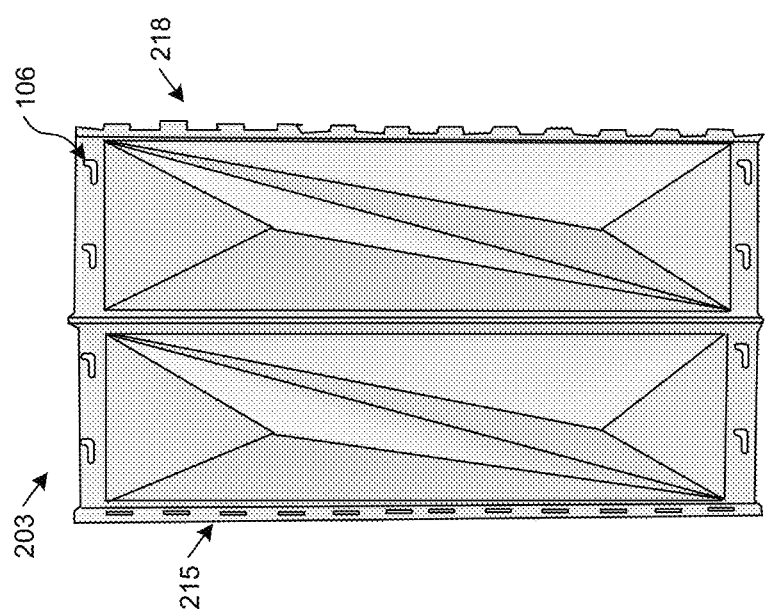
FIG. 2 illustrates an example of shutter panel design for a shutter panel system according to various embodiments described herein.

FIG. 2 shows alternative shutter panel design 203 for a shutter panel system 100. In this example, the rail connection holes 106 are shown to be different from the design of FIGS. 1A-1C, as are the various polygonal tessellation areas. The panel-to-panel interlocking elements 215 and 218 can also be different from that of FIGS. 1A-1C, while still corresponding to the general design principles discussed for FIGS. 1A-1C. For example, in this case, the male panel-to-panel interlocking elements 218 can fully slide into the female panel-to-panel interlocking elements 215, rather than fitting or snapping in from above as the other designs. The panel-to-panel interlocking elements 215 and 218 can be relatively loose or can provide an engineering fit with each other. The female panel-to-panel interlocking elements 215 can have a thicker element about their periphery to help with durability. While not shown, any one or more of the polygonal tessellation areas can be modified by the computer instructions to be a slitted area with holes or gaps so that the overall design matches input parameters for total slitted area and/or solid-to-slitted ratio, as well as strength requirements.

Figure 3:
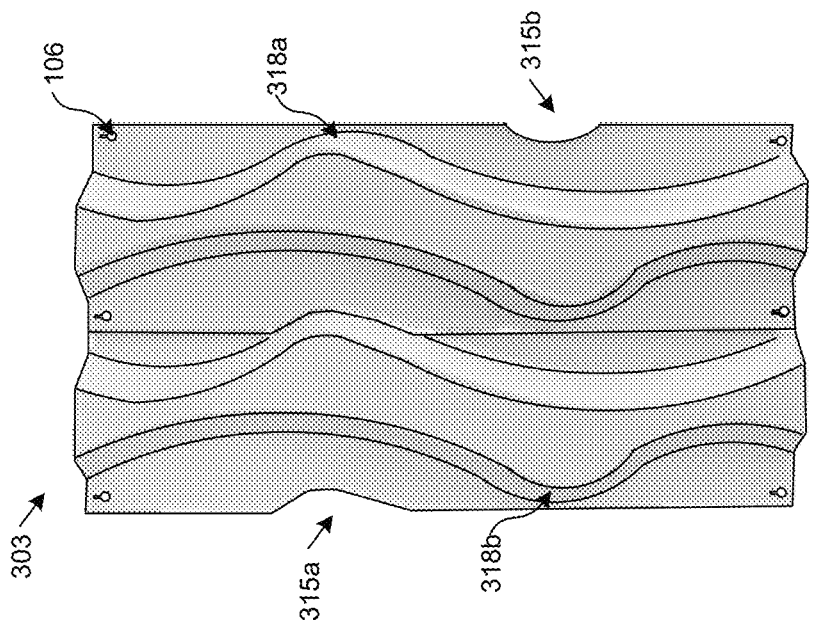
FIG. 3 illustrates another example shutter panel design for a shutter panel system according to various embodiments described herein.

FIG. 3 shows alternative shutter panel design 303 for a shutter panel system 100. This example shows that tessellations can include smooth or curved surfaces, as well as flat surfaces with curved edges that fit together in a 3D tessellated design. In this example, the panel-to-panel interlocking elements 315a-315b and 318a-318b can also be different from and describe additional features than that of the previously discussed interlocking elements. For example, the female interlocking elements 315a and 315b can be provided on both sides rather than female on one side and male on the other. The female interlocking elements 315a and 315b can also include a cutout from a tessellation section of the "main panel" or the portion of the panel other than the panel-to-panel interlocking elements and the panel to rail elements. Interlocking elements 318a-318b can include an integrated three-dimensional portion of a raised tessellation area. While not shown, any one or more of the curved tessellation areas can be modified by the computer instructions to be a slitted area with holes or gaps so that the overall design matches input parameters for total slitted area and/or solid-to-slitted ratio, as well as strength requirements.

Figure 4:
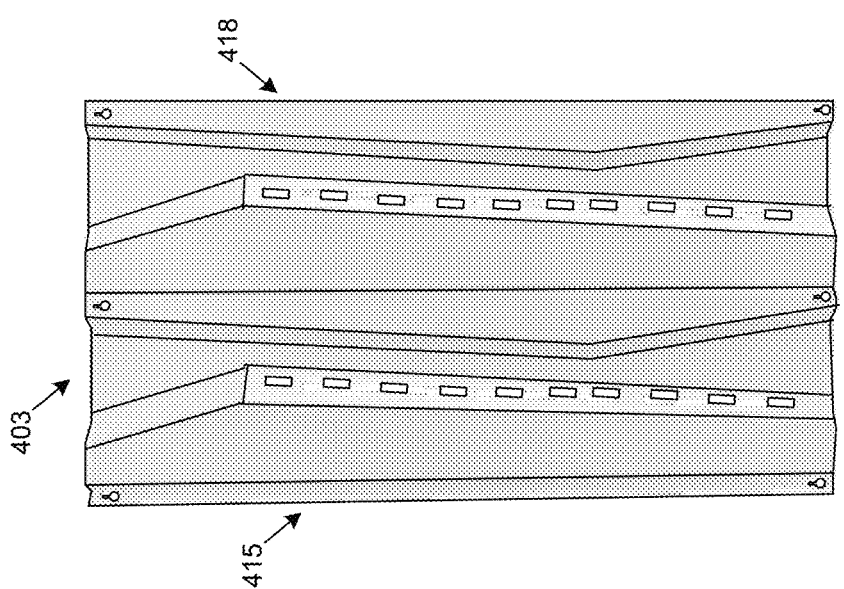
FIG. 4 illustrates another example shutter panel design for a shutter panel system according to various embodiments described herein.

FIG. 4 shows alternative shutter panel design 403 for a shutter panel system 100. In this example, the panel-to-panel interlocking elements 415 and 418 can be different from and describe additional features than that of the previously discussed interlocking elements. Here, the panel-to-panel interlocking elements 415 can be designed to fit "under" or "over" the interlocking elements 418.

Figure 5:
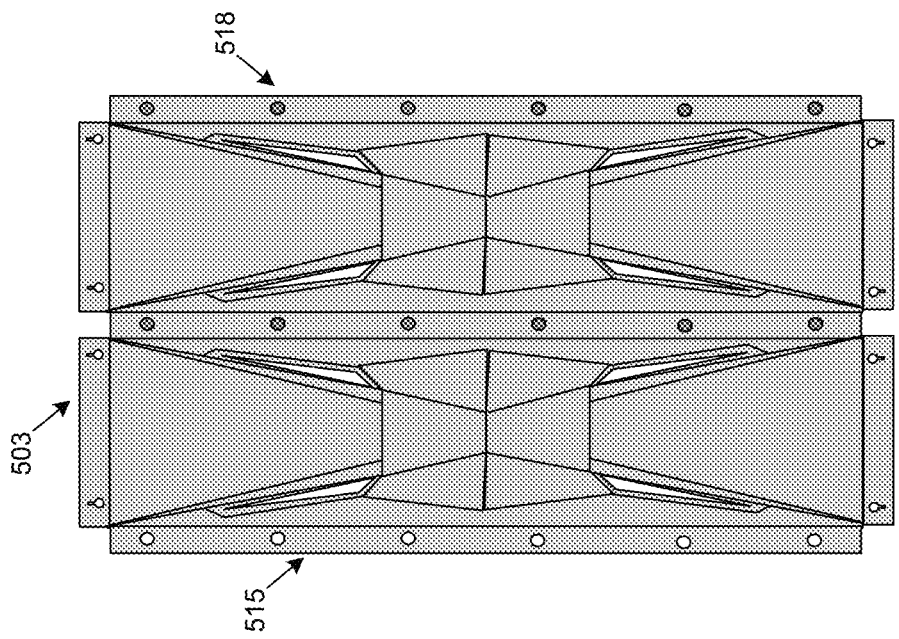
FIG. 5 illustrates another example shutter panel design for a shutter panel system according to various embodiments described herein.

FIG. 5 shows alternative shutter panel design 503 for a shutter panel system 100. In this example, the panel-to-panel interlocking elements 515 and 518 can be different from and describe additional features than that of the previously discussed interlocking elements. Here, the panel-to-panel interlocking elements 515 can be designed to fit "under" or "over" the panel-to-panel interlocking elements 518 much like that of the panel-to-panel interlocking elements 415 and 418 of FIG. 4. However, the panel-to-panel interlocking elements 515 can include female cutouts or indents on a surface of a side interconnect area that can accept male nodules of the panel-to-panel interlocking elements 518 that insert in a "z" direction or into the page as shown, where the "x-y" direction is a plane of the page as shown.

FIG. 6 shows an example method of design of a storm shutter system. At box 603, the method can include generating a model of a panel using a computer-aided design (CAD). For example, the system can include program instructions executable in the computing device that, when executed by the computing device, cause the computing device to generate a model of a panel using CAD. In some examples, the model generated in CAD can be used in fabrication of storm shutter panels, such as computer aided manufacture (CAM). Some example techniques for fabrication can include: punch and die CAD modeled and cut on CNC machine, prototype punch and die (short run), computer modeled shape cut and fold with brake, minimal welds (handmade), FDM type printing, computer model exported to 3D printer software with wall thickness and support settings determined, and other similar processes for manufacture.

At box 606, the method can include simulating a wind flow test on the model of the panel using computational fluid dynamics (CFD). For example, the system can include program instructions executable in the computing device that, when executed by the computing device, cause the computing device to simulate a wind flow test on the generated CAD model of the panel using CFD. For example, CFD can execute numerical methods such as the finite element method, the finite difference method, and the finite volume method to construct a visual simulation of the complex wind flow phenomena on the CAD model of the panel or panels. In some examples, the CAD software can interface or be integrated with the CFD software to allow iteration of the CAD design. As described herein, simulating a wind flow test can include setting parameters for at least one of: panel size, domain size, inlet wind speed, velocity profile, turbulence model, roughness element, mesh size, number of cells, and iterations to convergence.

At box 612, the method can include adjusting panel features for surface optimization. As described herein, adjusting panel features can include adjusting panel surface articulation depths and geometries. Further, adjusting panel features for surface optimization can utilize machine learning. For example, the system can include program instructions executable in the computing device that, when executed by the computing device, cause the computing device to iteratively modify certain parameters of the CAD model of the panel for optimization or specified test conditions. In another example, physical testing of fabricated panels based on the generated CAD model can provide feedback to train a machine learning algorithm, by identifying a type or location of the failure in the panel under test conditions. As can be understood, the example method can omit steps or include additional steps or be carried out in the order recited or in any other order that is logically possible.

Figure 7:
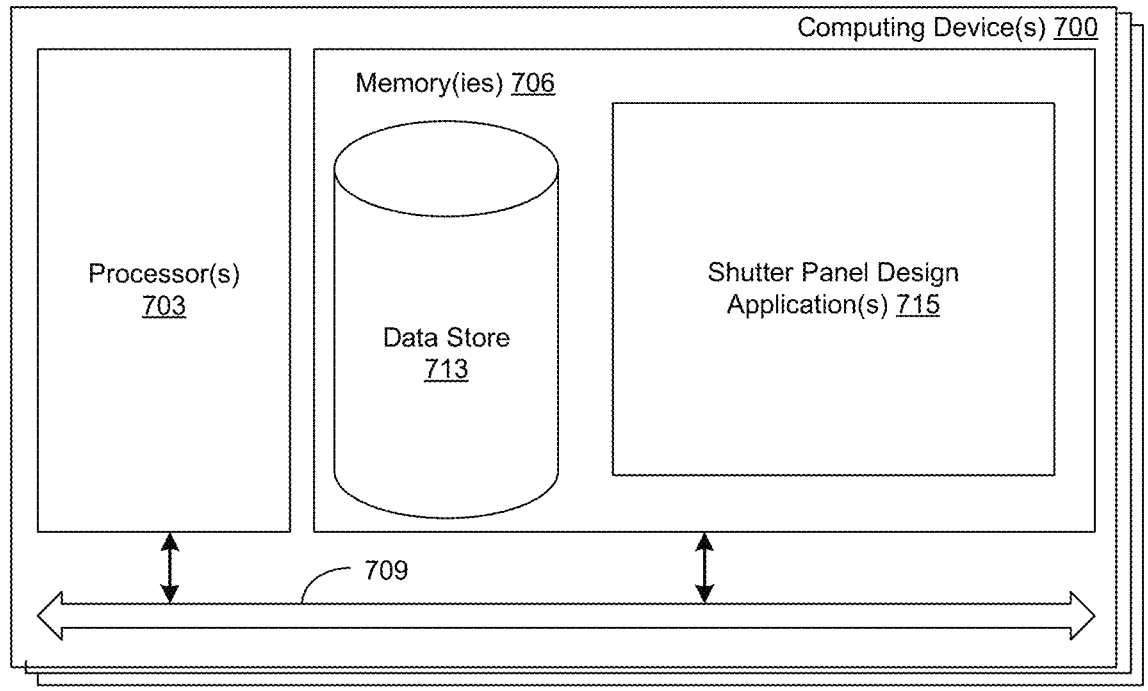
FIG. 7 illustrates an example computing device that executes one or more applications for shutter panel design according to various embodiments described herein.

With reference to FIG. 7, shown is a schematic block diagram of a computing device 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the shutter panel design application 715 and potentially other applications. Also stored in the memory 706 may be a data store 713 and other data. In addition, an operating system may be stored in the memory 706 and executable by the processor 703.

The shutter panel design application 715 can include one or more applications or sets of instructions that work in concert to generate the shutter panel designs and operate the machinery that fabricates these designs as described herein. It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random-access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the shutter panel design application 715 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the shutter panel design application 715, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the shutter panel design application 715, may be implemented and structured in a variety of ways. For example, one or more applications described may be implemented as modules or components of a single application. Further, one or more applications described herein may be executed in shared or separate computing devices 700 or a combination thereof. For example, a plurality of the applications described herein may execute in the same computing device 700, or in multiple computing devices 700 in the same computing environment.

Among embodiments, some aspects of the present disclosure are implemented by a computer program executed by one or more processors, as described, and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

Although the various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The functionality and operation of an implementation of portions of components described herein can refer to steps and actions implemented by various instructions and applications comprising the shutter panel design application(s) 715. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or another system. The machine code can be converted from the source code. If embodied in hardware, each block can represent a circuit or a number of interconnected circuits to implement the specified logical function(s).

Although sequences and flows can be described in a specific order of execution, it is understood that the order of execution can differ from that which is described. For example, the order of execution of two or more functions can be scrambled relative to the order described. Also, two or more block functions in succession can be executed concurrently or with partial concurrence. Further, in some embodiments, one or more of the functions can be skipped or omitted.

Also, any logic or application described herein that includes software or code can be embodied in any non-transitory computer-readable medium for use by or in connection with an instruction execution system such as a processor in a computer system or another system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. While aspects of design, computer functionality, and physical functionality can be discussed with respect to a particular figure, these aspects are also applicable and expandable to all of the figures discussed. All such modifications and variations are intended to be included in the following claims herein, within the scope of this disclosure.

Therefore, the following is claimed:

1. A storm shutter panel comprising:
a first surface configured to face an exterior environment of a building and a second surface configured to face an interior of the building;
at least one perforation extending between the first and second surface;
rail connection holes configured to securely affix the panel to at least a rail connection element of a rail without the use of additional hardware; and
interlocking elements configured for panel-to-panel assembly, wherein the interlocking elements comprise at least one of: a plurality of tab shapes along an edge of the storm shutter panel, a plurality of nodules protruding from the first surface proximal to the edge of the storm shutter panel, a curved cutout shape along the edge of the storm shutter panel, or any combination thereof.

2. The storm shutter panel of claim 1, wherein the first surface is at least one of: folded, pleated, and tessellated.

3. The storm shutter panel of claim 1, wherein the at least one perforation is configured to allow visual connectivity between the interior of the building and the exterior environment for air flow and natural lighting.

4. The storm shutter panel of claim 1, further configured to be stackable for storage.

5. The storm shutter panel of claim 1, further configured to be impact-resistant for a wind speed of 110 mph or greater.

6. The storm shutter panel of claim 1, further configured for mitigation of high winds and wind-borne debris.

7. The storm shutter panel of claim 1, further configured to withstand a wind gust speed of about 63 m/s to about 68 m/s.

8. The storm shutter panel of claim 1, wherein the at least one perforation is at least one slitted gap of a slitted area that provides a predetermined solid-to-slitted ratio for the storm shutter panel.

9. The storm shutter panel of claim 1, wherein the interlocking elements do not require additional hardware for assembly.

10. The storm shutter panel of claim 1, configured to be fabricated using standard sheet metal fabrication techniques of die stamping, using a press brake, or a combination thereof.

11. A storm shutter system, comprising:
at least one rail configured to be secured to a building structure, wherein the at least one rail comprises rail connection elements;
a plurality of panels, each panel comprising:
a first surface configured to face an exterior environment of a building and a second surface configured to face an interior of the building;
at least one perforation extending between the first and second surface;
rail connection holes configured to securely affix the panel to at least a rail connection element of the at least one rail without the use of additional hardware; and
interlocking elements configured for panel-to-panel assembly, wherein the interlocking elements comprise at least one of: a plurality of tab shapes along an edge of a panel, a plurality of nodules protruding from the first surface proximal to the edge of the panel, a curved cutout shape along the edge of the panel, or any combination thereof;
wherein the rail connection elements comprise a plurality of rods; and
wherein each rod of the plurality of rods comprises a panel retention component located at a distal end of the rod.

12. The storm shutter system of claim 11, wherein the plurality of panels are configured to be assembled by a single person.

13. The storm shutter system of claim 11, wherein interlocking elements are configured to connect one panel of the plurality of panels to another panel forming a unit of connected panels without using additional hardware.

14. The storm shutter system of claim 13, wherein the unit of connected panels are connected to the at least one rail via the rail connection holes.

15. The storm shutter system of claim 11, wherein the plurality of panels are compliant with American Society of Civil Engineers (ASCE 7) standards and testing.

16. The storm shutter system of claim 11, wherein the plurality of panels are compliant with International Building Code (IBC) standards and testing.

17. The storm shutter system of claim 11, wherein each panel retention component comprises a shape selected from a plurality of panel retention shapes, wherein the panel retention shapes comprise a circular shape, an ovular shape, a polygonal shape, and a gear shape.

* * * * *